(12) United States Patent
Yasukawa et al.

(10) Patent No.: US 8,207,447 B2
(45) Date of Patent: Jun. 26, 2012

(54) PTFE POROUS BODY, PTFE MIXTURE, METHOD FOR PRODUCING PTFE POROUS BODY, AND ELECTRIC WIRE/CABLE USING PTFE POROUS BODY

(75) Inventors: Yoshikazu Yasukawa, Shizuoka (JP); Toyota Iwasaki, Shizuoka (JP)

(73) Assignee: Kurabe Industrial Co., Ltd., Shizuoka (JP)

( * ) Notice: Subject to any disclaimer, the term of this patent is extended or adjusted under 35 U.S.C. 154(b) by 576 days.

(21) Appl. No.: 12/442,403

(22) PCT Filed: Sep. 18, 2007

(86) PCT No.: PCT/JP2007/068106
§ 371 (c)(1),
(2), (4) Date: Mar. 22, 2009

(87) PCT Pub. No.: WO2008/035682
PCT Pub. Date: Mar. 27, 2008

(65) Prior Publication Data
US 2010/0084156 A1    Apr. 8, 2010

(30) Foreign Application Priority Data
Sep. 22, 2006  (JP) ................. 2006-257925

(51) Int. Cl.
*H01B 7/00*        (2006.01)
(52) U.S. Cl. .................................. 174/110 R
(58) Field of Classification Search .............. 174/110 R, 174/110 AR–110 E, 119 C, 120 R, 120 AR–120 SR
See application file for complete search history.

(56) References Cited

U.S. PATENT DOCUMENTS

| | | | |
|---|---|---|---|
| 4,663,095 A | | 5/1987 | Battais |
| 4,678,709 A | * | 7/1987 | Tondre et al. ................. 428/380 |
| 5,188,890 A | * | 2/1993 | Ohashi et al. ............. 428/306.6 |
| 5,245,134 A | * | 9/1993 | Vana et al. ................. 174/117 F |
| 5,910,277 A | | 6/1999 | Ishino et al. |
| 5,985,296 A | * | 11/1999 | Moldenhauer et al. ....... 424/401 |
| 6,030,428 A | | 2/2000 | Ishino et al. |
| 6,509,422 B1 | | 1/2003 | Nagashima et al. |
| 2007/0009727 A1 | | 1/2007 | Sawada et al. |
| 2008/0138630 A1 | * | 6/2008 | Yasukawa ..................... 428/422 |

FOREIGN PATENT DOCUMENTS

JP        42135560 A      8/1967
(Continued)

OTHER PUBLICATIONS

Extended European Search Report for EP07807494.5, European Application Corresponding to U.S. Appl. No. 12/422,403 (National Phase of PCT/JP2007/068106), Jun. 29, 2010, pp. 1-7.

(Continued)

*Primary Examiner* — William Mayo, III
(74) *Attorney, Agent, or Firm* — Vincent K. Gustafson; Jenkins, Wilson, Taylor & Hunt, P.A.

(57) ABSTRACT

A polytetrafluoroethylene porous body which is produced by molding a polytetrafluoroethylene mixture, including a polytetrafluoroethylene powder and a pore-forming agent, into a predetermined shape, and subsequently removing the pore-forming agent. The pore-forming agent includes (a) one or more powders selected from a group consisting of dicarboxylic acid powders and benzoic acid powders, and (b) an organic solvent.

20 Claims, 8 Drawing Sheets

FOREIGN PATENT DOCUMENTS

| | | | |
|---|---|---|---|
| JP | S5730059 B2 | 6/1982 |
| JP | 58119834 A | 7/1983 |
| JP | 6093709 A | 5/1985 |
| JP | 61066730 A | 4/1986 |
| JP | 63172743 A | 7/1988 |
| JP | 1011142 A | 1/1989 |
| JP | 03277639 A | 12/1991 |
| JP | H04-372631 A | 12/1992 |
| JP | 5093086 A | 4/1993 |
| JP | 10-30031 A | 10/1998 |
| JP | 11124458 A | 5/1999 |
| JP | 11209548 B2 | 8/1999 |
| JP | 4-372631 A | 5/2000 |
| JP | 2001067944 A | 3/2001 |
| JP | 2004500261 A | 1/2004 |
| JP | 2005-336459 | * 12/2005 |
| JP | 2005336459 A | 12/2005 |
| JP | 2007090892 A | 4/2007 |
| JP | 2007153967 A1 | 6/2007 |
| WO | 0154879 A1 | 8/2001 |
| WO | 2005019320 A1 | 3/2005 |

OTHER PUBLICATIONS

Office Action issued on Nov. 25, 2010 in Korean Patent Application No. 10-2009-7008069.

Office Action issued on Nov. 25, 2010 in Korean Patent Application No. 10-2009-7008069 (Partial English Translation).

* cited by examiner

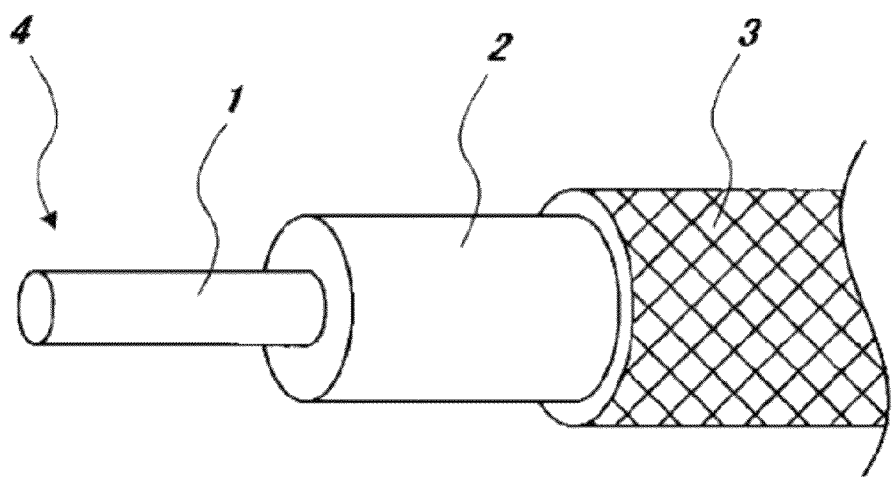
FIG._1
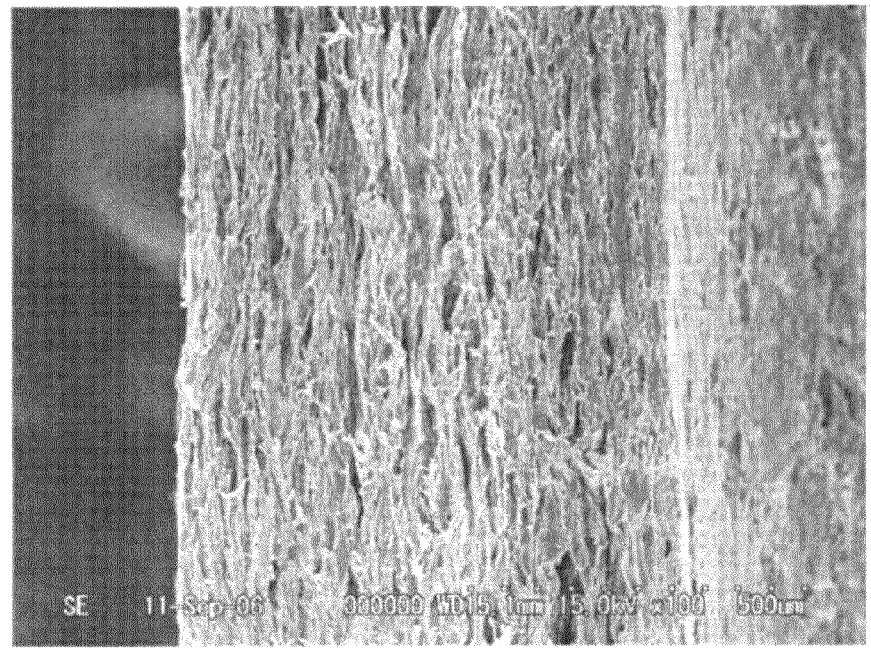
FIG._2

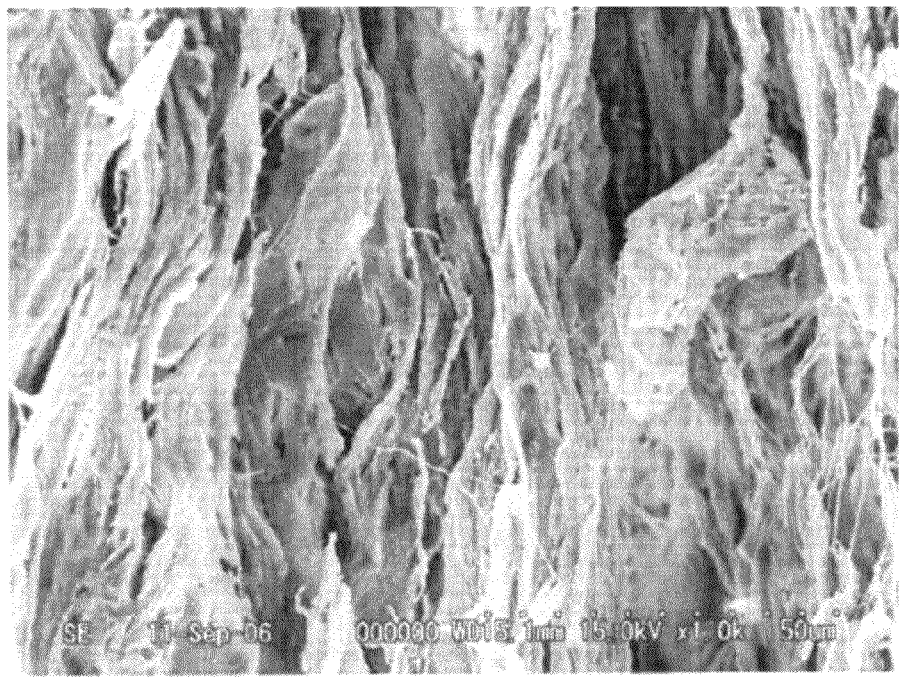
FIG._3
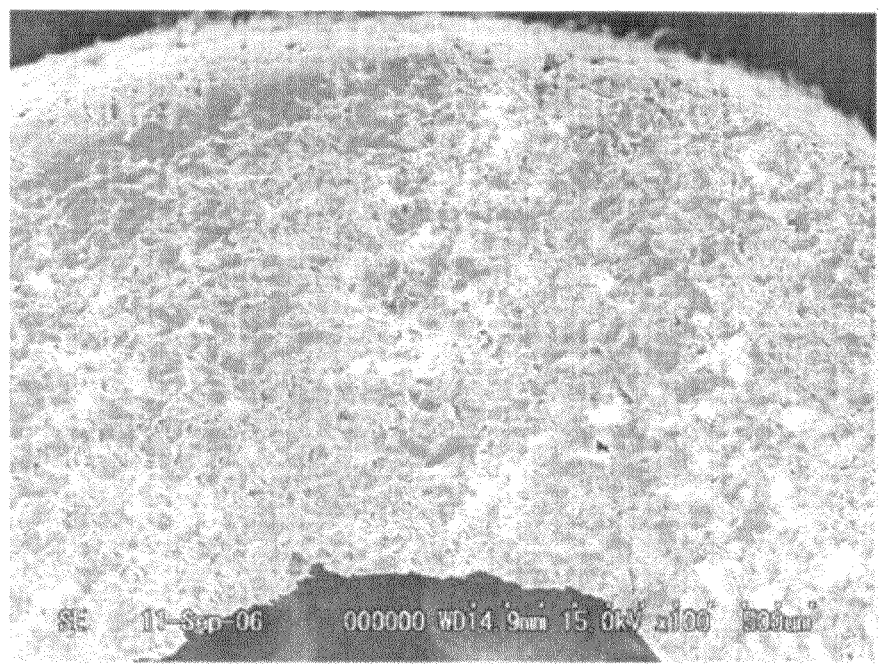
FIG._4

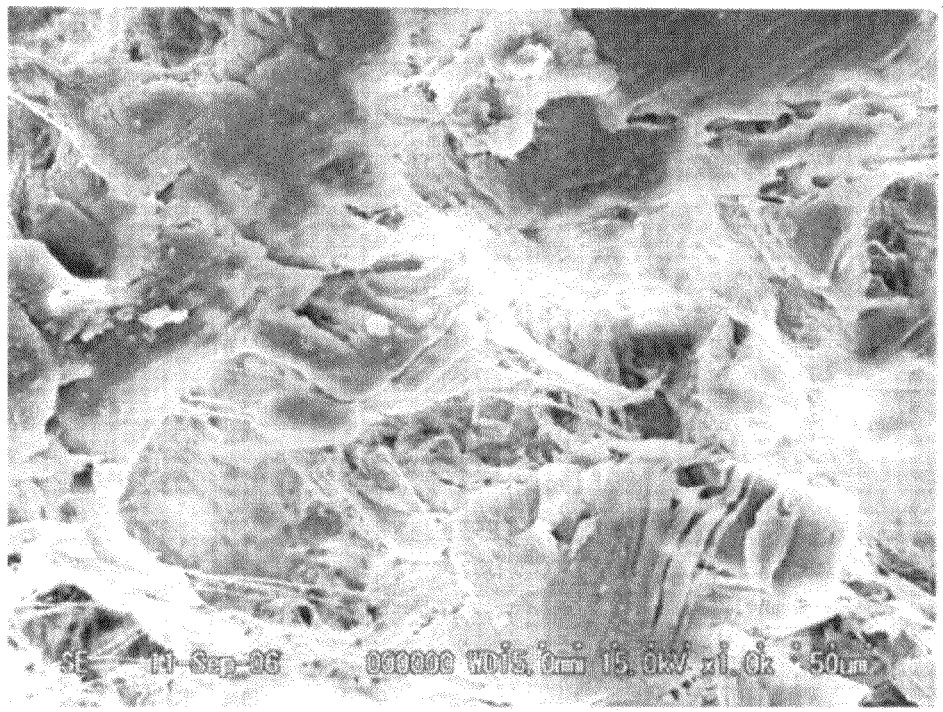
FIG._5
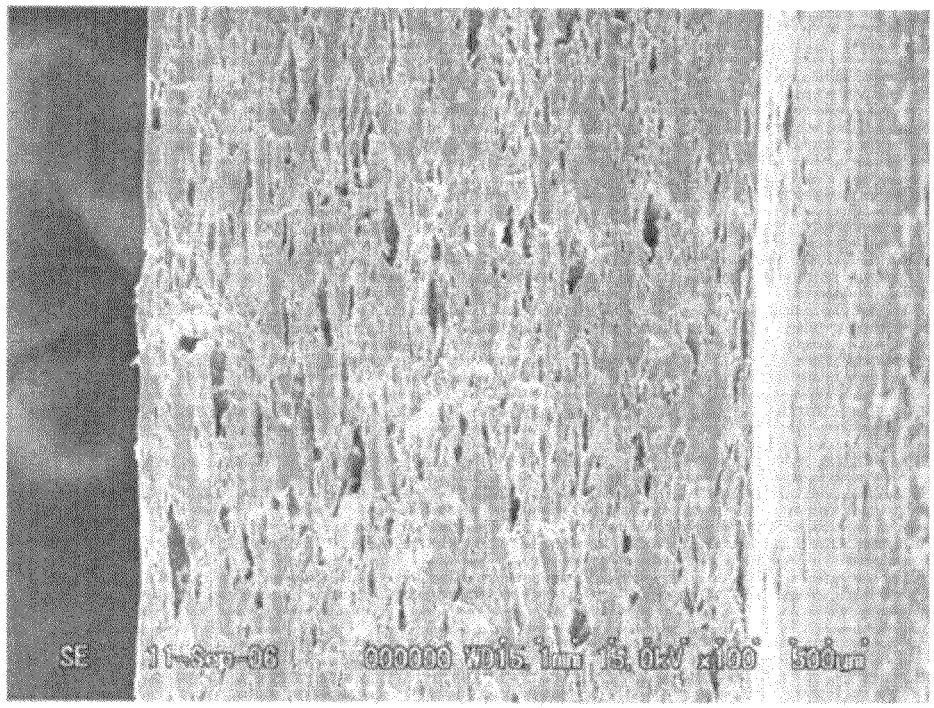
FIG._6

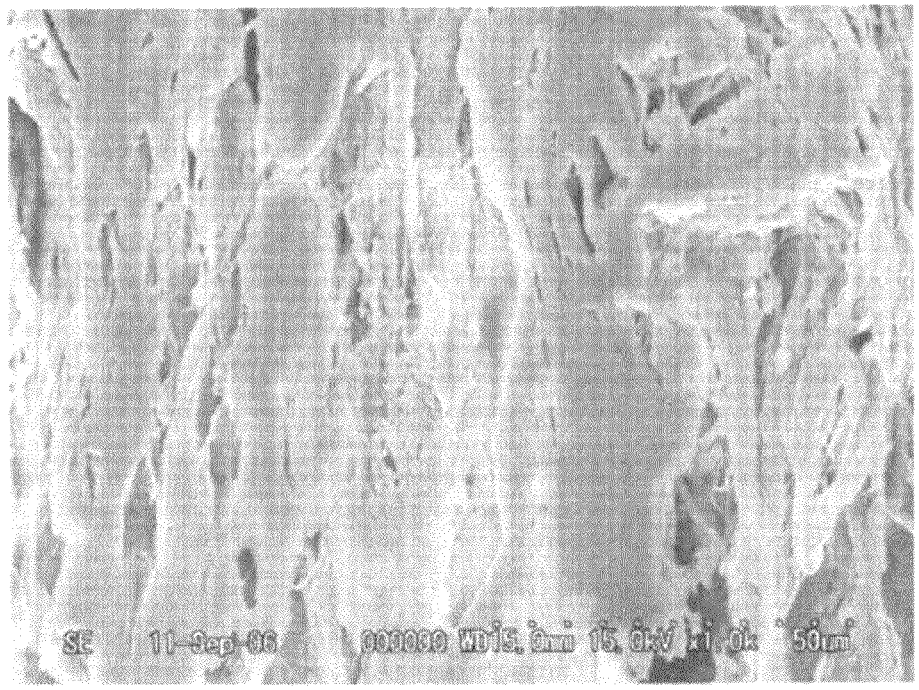
FIG._7
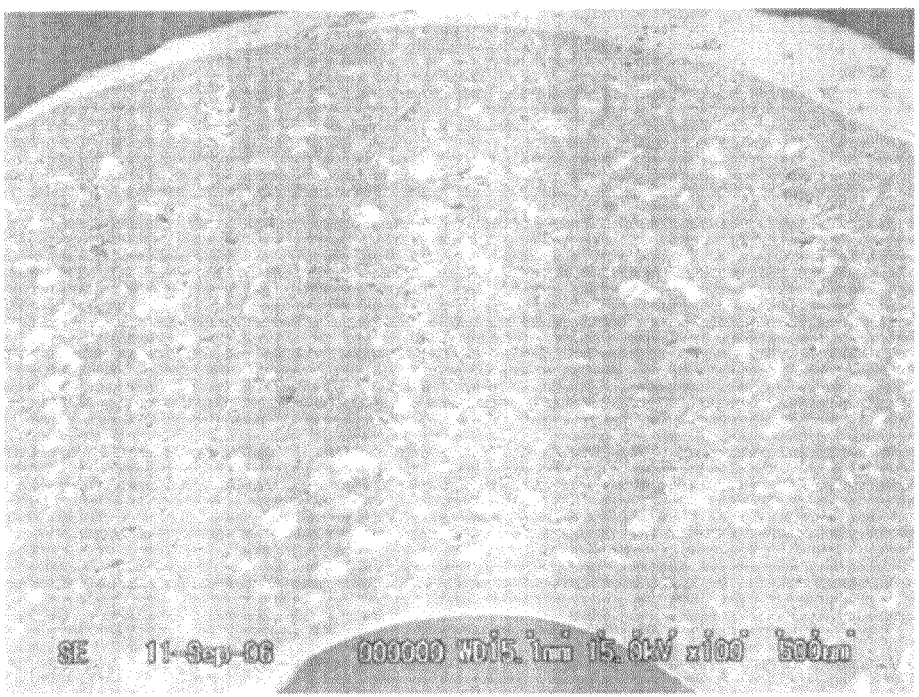
FIG._8

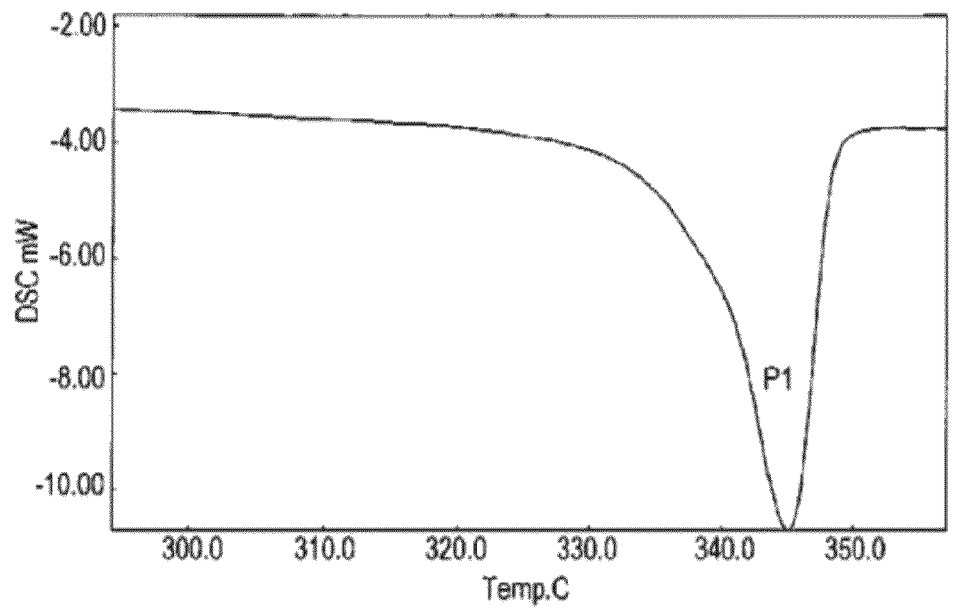
FIG._13
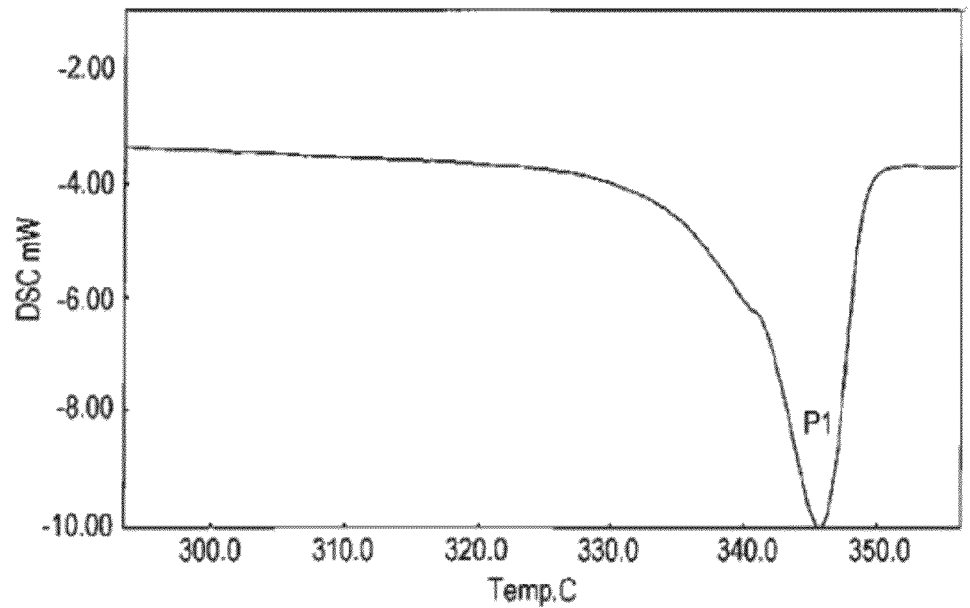
FIG._14

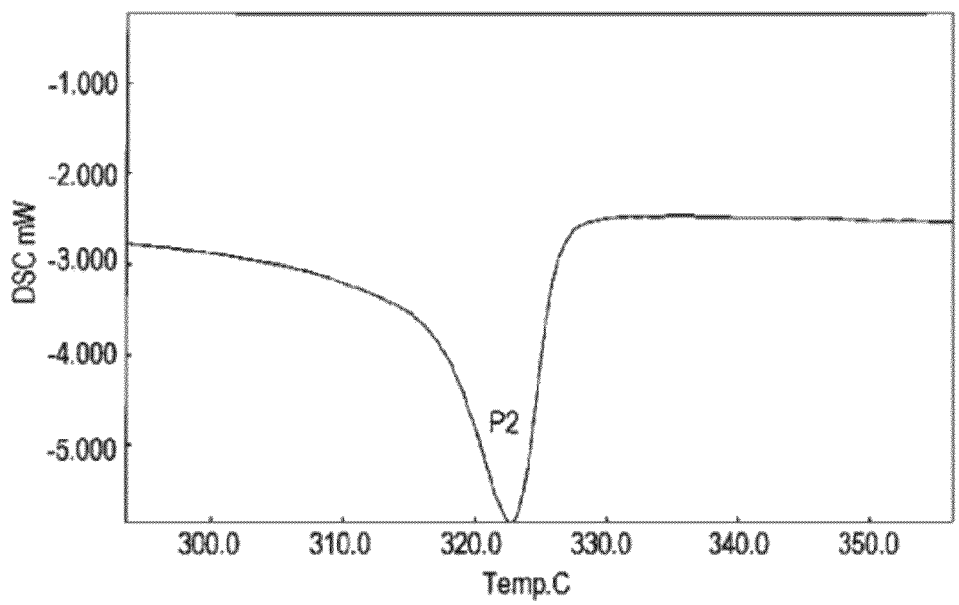
FIG._15
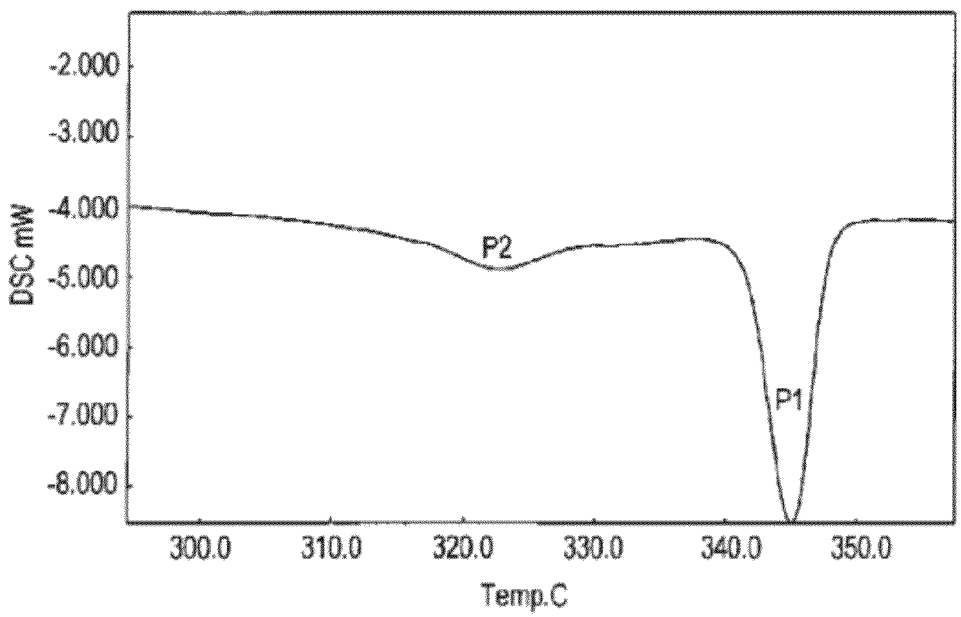
FIG._16

PTFE POROUS BODY, PTFE MIXTURE, METHOD FOR PRODUCING PTFE POROUS BODY, AND ELECTRIC WIRE/CABLE USING PTFE POROUS BODY

CROSS-REFERENCE TO RELATED APPLICATIONS

This application is a U.S. national phase under the provisions of 35 U.S.C. §371 of International Application No. PCT/JP07/68106 filed on Sept. 18, 2007, which in turn claims priority of Japanese Patent Application No. 2006-257925 filed on Sept. 22, 2006. The disclosures of such international application and Japanese priority application are hereby incorporated herein by reference in their respective entireties, for all purposes.

TECHNICAL FIELD

The present invention relates to a polytetrafluoroethylene (hereinafter referred to as "PTFE") porous body, a PTFE mixture, and an electric wire/cable using the PTFE porous body.

BACKGROUND ART

PTFE porous bodies are excellent in heat resistance and chemical resistance as well as in electrical properties, such as relative dielectric constant and energy loss angle, and thus are used for multiple purposes, such as electric wire covering materials, dielectric materials for coaxial cables, filters, gaskets, heat insulating materials, separation membranes, artificial blood vessels, catheters, and incubators.

In a well-known method for producing such a PTFE porous body, a mixture of a PTFE powder and a binding agent is fine ground and molded into a molding by a known method, and then the molding is baked.

In another well-known method for producing a PTFE porous body, a mixture of a PTFE powder and a pore-forming agent is molded into a predetermined shape, and then the pore-forming agent is removed to make pores.

Patent Document 1, for example, discloses a method for producing a PTFE porous body by baking a non-baked PTFE at a temperature higher than a melting point of PTFE, grinding the baked PTFE to provide a baked PTFE powder, and subsequently molding the powder into a molding having a predetermined shape by a pressure of 1 g/cm$^2$ to 800 kg/cm$^2$ and again baking the molding at a temperature higher than the melting point of PTFE.

Patent Document 2, for example, discloses a method for producing a PTFE porous body which includes a step of mixing a PTFE powder and a binding agent having a lower melting point than PTFE and a decomposition temperature higher than a baking temperature of PTFE, a step of gelling and then fine grinding a resulting mixture, a step of performing ram extrusion of a fine ground powder to make a preform, and a step of baking the preform under unrestrained condition.

Patent Document 3, for example, discloses a method for producing a porous body by molding a PTFE including a liquid lubricant, which acts as a pore-forming agent, and heating a molded PTFE in a stretched state. Also, there is disclosed, as a conventional technology, a method for producing a porous body by mixing a PTFE and a liquid lubricant which acts as pore-forming agents, molding a mixture, and then removing the liquid lubricant. Examples of the liquid lubricant listed therein are naphtha, white oil, toluole, xylole, and the like.

Patent Document 4 discloses a method for producing a porous body by molding a mixture of a PTFE powder, and a foaming agent and a liquid lubricant, which act as pore-forming agents, into a predetermined shape, heating a molded mixture to cause foaming to thereby making countless fine pores, and subsequently performing stretching. Examples of the foaming agent listed therein are azo foaming agents, hydrazide foaming agents, semicarbazide foaming agents, nitroso foaming agents, ammonium carbonates, sodium bicarbonates, ammonium nitrites, and the like. Examples of the liquid lubricant listed therein are liquid paraffin, naphtha, white oil, toluene, xylene, and the like.

Patent Document 5 discloses a producing method of mixing of a PTFE powder with a fine pore-forming agent, an expanding agent, and a lubricant oil, which act as pore-forming agents; cold extrusion; sequentially performing evaporation of the lubricant oil, sublimation or decomposition of the fine pore-forming agent and the expanding agent; and baking of PTFE. An example of the lubricant oil therein is a mixture of aliphatic hydrocarbon. Examples of the fine pore-forming agent listed therein are compounds, such as benzene, toluene, naphthalene, benzaldehyde, and aniline, or monohalide or polyhalide derivatives of these compounds. Examples of the expanding agent listed therein are azodicarbonamide, modified azodicarbonamide, 5-phenyltetrazole and derivatives thereof, and aromatic derivatives of hydrazine.

Patent Documents 6 and 7 disclose heating and baking a PTFE including a pore-forming agent to make the PTFE porous by the action of the pore-forming agent. Examples of the pore-forming agent listed therein are ammonium hydrogen carbonate, ammonium carbonate, and ammonium nitrite.

Patent Document 8, discloses a method for producing a porous body by performing extrusion of a PTFE including a foaming agent, which acts as a pore-forming agent, and subsequently removing the foaming agent. Examples of the foaming agent listed therein are azo compounds, sodium carbonate, ammonium carbonate, hydrazine, tetrazole, benzoxazine, semicarbazide, and the like.

Patent Document 9 discloses combining camphor, menthol, and naphtha appropriately for use as a pore-forming agent.

Patent Document Japanese Unexamined Patent Publication No. 61-66730
Patent Document 2: Japanese Unexamined Patent Publication No. 5-93086
Patent Document 3: Japanese Examined Patent Publication No. 42-13560
Patent Document 4: Japanese Examined Patent Publication No. 57-30059
Patent Document 5: Japanese Unexamined Patent Publication No. 60-93709
Patent Document 6: Japanese Unexamined Patent Publication No. 11-124458
Patent Document 7: Japanese Unexamined Patent Publication No. 2001-67944
Patent Document 8: Japanese Unexamined Patent Publication No. 2004-500261
Patent Document 9: Japanese Unexamined Patent Publication No. 2005-336459

DISCLOSURE OF THE INVENTION

Problems to be Solved by the Invention

However, according to the producing method as disclosed in Patent Document 1 or 2 in which a fine-ground PTFE powder is again molded, it is impossible to obtain a fine-textured molding due to large pore diameters, and also it is extremely difficult to obtain a molding having a high porosity or to control the porosity.

Also, as mentioned above, the pore-forming agents and the liquid lubricant, the foaming agent, the fine pore-forming agent, the expanding agent, and the lubricant oil, which act as a pore-forming agent, disclosed in Patent Documents 3-8 are in a low-viscosity liquid or powder form. Furthermore, a widely used conventional pore-forming agent is naphtha, which is also in a low-viscosity liquid form. Use of such a pore-forming agent involves the following problems.

Firstly, when the pore-forming agent is constituted only by a low-viscosity liquid, only a specific amount of the low-viscosity liquid can be retained by the PTFE powder and an excess amount thereof exudes. Accordingly, it is difficult to produce a porous body having a porosity higher than 25%. An additional problem is that when a resulting porous body is completely baked, pores will break and substantially will not remain present.

Secondly, when the pore-forming agent is in a powder form as disclosed in Patent Documents 3-8, powder particles tend to form lumps, which results in coarse pores. Accordingly, it is impossible to produce a fine-textured porous body. When coarse pores are present, a mechanical strength of the porous body will be decreased. For example, when an external force, such as a bending force, is applied to the porous body, a stress concentration occurs in pore regions, resulting in generation of cracks or cuts.

Although Patent Documents 3-8 describe use of gas generating substances, such as foaming agents or expanding agents, in order to form pores, generated gases will not stay there but flow away in these cases. Accordingly, these gas generating substances will not actually contribute to formation of pores. Moreover, most foaming agents or expanding agents leave residue, which may cause adverse effects on electrical properties.

Further, when the pore-forming agent is constituted by mixing a low-viscosity liquid and a powder, the same problems as in the case of the pore-forming agent being a low-viscosity liquid or in the case of the pore-forming agent being a powder. Specifically, while pores which are made by areas lacking in powder particles become coarse, the powder particles tend to form lumps since the low-viscosity liquid cannot retain the powder particles in a dispersed manner, which results in further coarse pores. As a result, it is impossible to produce a fine-textured porous body. Also, if a large amount of the low-viscosity liquid as the pore-forming agent is mixed in, an excess amount thereof will exude.

Moreover, in a producing method as disclosed in Patent Document 9 in which camphor or the like is used as the pore-forming agent, odor is generated during the production process and operation environments may be worsened.

The present invention, which has been made to solve these problems in the conventional technologies, has an object to provide a technology that achieves obtaining a fine-textured PTFE porous body, easily controlling porosity, and preventing generation of odor during the production process, and an electric wire/cable or the like using the PTFE porous body.

Means to Solve the Problems

A PTFE porous body in a first aspect of the present invention is a PTFE porous body which is produced by molding a PTFE mixture, including a PTFE powder and a pore-forming agent, into a predetermined shape, and subsequently removing the pore-forming agent, in which the pore-forming agent includes one or more powders selected from a group consisting of dicarboxylic acid powders and benzoic acid powders.

The PTFE porous body in the first aspect of the present invention is fine-textured, and its porosity may be easily controlled by discretionarily setting a mixed amount of the pore-forming agent thereby to achieve a high porosity. Also, odor is not generated during the production of the PTFE porous body in the first aspect of the present invention.

A fine texture of the PTFE porous body may lead to the following effects. Firstly, since pores have a fine and uniform size and no coarse pores are present, even if an external force such as a bending force is applied, a stress will be dispersed, and thus cracks or cuts are less likely to be generated. That is, an excellent mechanical strength may be achieved. Also, when the PTFE porous body is used for a heat insulating material, fine pores may reduce heat transfer by radiation, which is a type of heat transfer. Further, when the PTFE porous body is used for a sealing material such as a gasket, an improved surface smoothness may be obtained, and thus an improved sealing performance may be achieved. Moreover, when the PTFE porous body is used for an insulating material such as an electric wire covering, an improved dielectric breakdown strength may be achieved.

In the meantime, when a PTFE porous body is used for a dielectric material in a coaxial cable, or the like, pore regions and PTFE regions have different dielectric constants. Accordingly, when pores are coarse and nonuniform, a delay time of signal will be irregular depending on a location in the dielectric material. However, when pores are fine and uniform, such an irregularity may be prevented.

A high porosity of the PTFE porous body may lead to the following effects. Firstly, since the entire PTFE porous body may have a small specific gravity, a demand for weight reduction may be satisfied. Also, when the PTFE porous body is used for a heat insulating material, an increased content of air having a low heat conductivity may lead to an improved heat insulating effect. Further, when the PTFE porous body is used for a filter, increased conducting passages may achieve a longer life before clogging.

In the meantime, when a PTFE porous body is used for a dielectric material, an effective relative dielectric constant ($\in_e$) of the porous body is obtained according to the following formula:

$$\in_e = \in_A^{1-v}$$

based on a relative dielectric constant ($\in_A$) and a porosity (V) of PTFE. Accordingly, the high porosity may lead to a low effective relative dielectric constant. Since a delay time of signal ($\tau$) is obtained according to the following formula:

$$\tau = 3.33561 \sqrt{\in_e} \, (\text{ns/m})$$

based on the effective relative dielectric constant ($\in_e$) of the porous body, the high porosity may lead to a short delay time of signal.

In the PTFE porous body in the first aspect of the present invention, the pore-forming agent preferably further includes an organic solvent. By including the organic solvent, a resistance against a tube wall may be reduced during extrusion molding. The organic solvent is preferably a petroleum solvent having a kinematic viscosity of 2 $\text{mm}^2/\text{s}$ (40° C.) or more.

In the PTFE porous body in the first aspect of the present invention, the one or more powders selected from the group consisting of dicarboxylic acid powders and benzoic acid powders are preferably a fumaric acid powder. Also, in the PTFE porous body in the first aspect of the present invention, the one or more powders selected from the group consisting of dicarboxylic acid powders and benzoic acid powders preferably have a particle diameter of 100 µm or less. Further, in the PTFE porous body in the first aspect of the present invention, a shrinkage rate in one side after baking is preferably 35% or less.

A PTFE porous body in a second aspect of the present invention has a porosity of 5% or more, has only an endothermic peak of a baked state (a completely-baked state) in a crystal melting curve by differential scanning calorimetry (DSC), and has a non-stretched and elongated configuration.

A PTFE porous body in a third aspect of the present invention has an ambiguous endothermic peak of a baked state (a completely-baked state) in a crystal melting curve by differential scanning calorimetry (DSC), and has a non-stretched and elongated configuration.

In the PTFE porous body in the second aspect or in the PTFE porous body in the third aspect of the present invention, pores preferably are configured to be oriented in a longitudinal direction.

The PTFE porous body in any of the first to third aspects of the present invention may be suitably used for various purposes such as, for example, not only electric wire covering materials and dielectric materials for coaxial cables but also filters, gaskets, heat insulating materials, separation membranes, artificial blood vessels, catheters, and incubators.

A PTFE mixture according to the present invention includes a PTFE powder and a pore-forming agent, and the pore-forming agent includes one or more powders selected from a group consisting of dicarboxylic acid powders and benzoic acid powders.

The PTFE mixture of the present invention may be used for producing the PTFE porous body in the first to third aspects. In the PTFE mixture of the present invention, the one or more powders selected from the group consisting of dicarboxylic acid powders and benzoic acid powders are preferably a fumaric acid powder. Also, in the PTFE mixture of the present invention, the one or more powders selected from the group consisting of dicarboxylic acid powders and benzoic acid powders preferably have a particle diameter of 100 µm or less.

A method for producing a PTFE porous body according to the present invention includes the steps of molding the above described PTFE mixture into a predetermined shape, and subsequently removing the pore-forming agent to make pores.

According to the method for producing a PTFE porous body of the present invention, the PTFE porous body in any of the first to third aspects may be produced.

An insulated electric wire according to the present invention includes a center conductor and an insulating material, which includes the above described PTFE porous body and is molded on a circumference of the center conductor.

A coaxial cable according to the present invention includes the above described insulated electric wire and an external conductor formed on a circumference of the insulating material of the insulated electric wire.

The external conductor in the coaxial cable according to the present invention preferably includes braided metal wires. Alternatively, the external conductor in the coaxial cable according to the present invention preferably includes a metal pipe (particularly preferably includes a corrugated metal pipe).

BRIEF DESCRIPTION OF THE DRAWINGS

FIG. 1 is a partially cut-out perspective view showing a structure of a coaxial cable according to an embodiment of the present invention.

FIG. 2 is a photograph at a magnification of 100 times showing a surface of a sample piece in Embodiment 19 cut in a longitudinal direction.

FIG. 3 is a photograph at a magnification of 1000 times showing the surface of the sample piece in Embodiment 19 cut in the longitudinal direction.

FIG. 4 is a photograph at a magnification of 100 times showing a surface of the sample piece in Embodiment 19 cut perpendicularly to the longitudinal direction.

FIG. 5 is a photograph at a magnification of 1000 times showing the surface of the sample piece in Embodiment 19 cut perpendicularly to the longitudinal direction.

FIG. 6 is a photograph at a magnification of 100 times showing a surface of a sample piece in Embodiment 22 cut in a longitudinal direction.

FIG. 7 is a photograph at a magnification of 1000 times showing the surface of the sample piece in Embodiment 22 cut in the longitudinal direction.

FIG. 8 is a photograph at a magnification of 100 times showing a surface of the sample piece in Embodiment 22 cut perpendicularly to the longitudinal direction.

FIG. 13 is a graph showing a crystal melting curve by differential scanning calorimetry (DSC) of a dielectric material including a PTFE resin in a "slightly baked state" as a main component.

FIG. 14 is a graph showing a crystal melting curve by differential scanning calorimetry (DSC) of a dielectric material including a PTFE resin in a "non-baked state" as a main component.

FIG. 15 is a graph showing a crystal melting curve by differential scanning calorimetry (DSC) of a dielectric material including a PTFE resin in a "completely baked state" as a main component.

FIG. 16 is a graph showing a crystal melting curve by differential scanning calorimetry (DSC) of a dielectric material including a PTFE resin in a "semi-baked state" as a main component.

Figure 9:
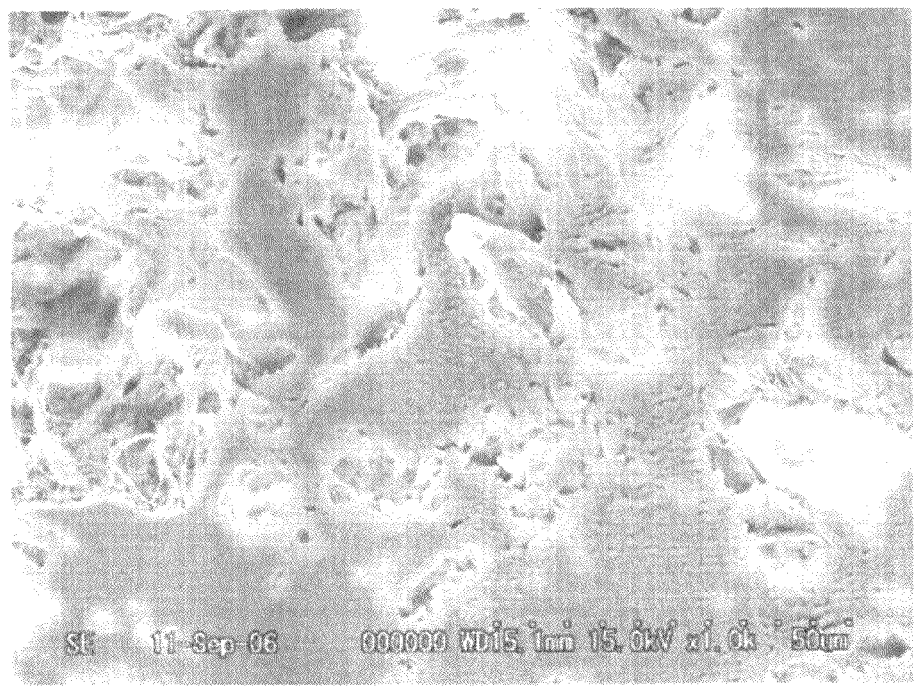
FIG. 9 is a photograph at a magnification of 1000 times showing the surface of the sample piece in Embodiment 22 cut perpendicularly to the longitudinal direction.

| EXPLANATION OF REFERENCE NUMERALS | |
|---|---|
| 1 | center conductor |
| 2 | dielectric material |
| 3 | external conductor |
| 4 | coaxial cable |

BEST MODE FOR CARRYING OUT THE INVENTION

A PTFE powder to be used in the present invention may be, for example, fine powder or molding powder. In a case of paste extrusion molding for an electric wire or the like, it is preferable to use fine powder, which can be fibered easily. In a case of press molding or ram molding, during which a material is not shrunk (i.e., a cross-sectional area of a preform and a cross-sectional area of a molded body before baking are approximately equal), either of molding powder or fine powder may be used. When a content rate of a PTFE is less than 40% in the case of paste extrusion molding, strength in a longitudinal direction is sufficient for molding due to fibering, but interfiber bonding in a transverse direction is so weak that a material is prone to be split during paste extrusion molding and after baking. By using a PTFE having a particle diameter of 100 μm or less and a pore-forming agent, it may be possible to increase bonding points in the PTFE and increase fiber strength in the transverse direction to thereby suppress the material from being split.

The pore-forming agent to be mixed with a PTFE powder in the present invention includes one or more powders selected from a group consisting of dicarboxylic acid powders and benzoic acid powders.

Dicarboxylic acids include, for example, fumaric acid, malonic acid, malic acid, succinic acid, and adipic acid. By using a powder of such a dicarboxylic acid, a PTFE porous body having a fine-texture and an excellent dimensional accuracy may be obtained, unlike the case of using the pore-forming agents described in the above-mentioned Patent Documents 3-8, although the reasons therefor are not yet clear. Also, it may be possible to employ extrusion molding since a resistance against a tube wall will not be large. Further, odor will not be generated during the production of the PTFE porous body.

Among these various dicarboxylic acids, fumaric acid which may give a substantial effect of suppressing shrinkage during baking is especially preferable. Also, a dicarboxylic acid having a property of evaporation by heating in the air (for example, fumaric acid, adipic acid, or succinic acid) is preferable since the pore-forming agent may be evaporated and thereby removed easily by heating. According to a method of removing the pore-forming agent by evaporation, as compared with, for example, a method of removing by thermal decomposition, residue is unlikely to remain in a PTFE and thus adverse effects on electric properties due to residue may be suppressed. A dicarboxylic acid powder, which has a property of evaporation by heating in the air and, for example, has a boiling point (or a sublimation point) of 300° C. or lower (for example, fumaric acid or succinic acid), is preferable since the pore-forming agent may be removed easily by means of a commonly used furnace or the like instead of a specific device. Also, a dicarboxylic acid powder having a boiling point of 300° C. or lower, which is removed at a temperature lower than a baking temperature of a PTFE (for example, 370-400° C.), may prevent an accident of ignition of dicarboxylic acid components during baking.

The one or more powders selected from the group consisting of dicarboxylic acid powders and benzoic acid powders preferably have an average particle diameter of 100 μm or less. Such a particle diameter will lead to smaller pores, and thus a more fine-textured PTFE porous body may be obtained. Further, the use of a pore-forming agent having a smaller particle diameter brings effects of preventing cracks or splits of a paste extrudate and achieving a better extrusion moldability.

The one or more powders selected from the group consisting of dicarboxylic acid powders and benzoic acid powders may be produced by grinding a powder having a large particle diameter into a fine-particle powder. Grinding may be performed in a gas phase easily by using a rotary blade mixer or grinder. A grinding method is not limited to grinding in a gas phase, but grinding in a solution may be possible in some cases. For example, in a case of fumaric acid having a low solubility in water, grinding in water by a rotary blade may be possible. However, since grinding in a solution requires a step of separation from water, grinding in a gas phase is preferable. There are no specific limitations to the grinding method or a size (a throughput capacity) of equipment to be used for grinding, and a ball mill, a jet mill (an airflow grinding), or the like may be employed other than a rotary blade mill. It is to be noted that the average particle diameter is measured by a dynamic light scattering type particle size distribution measuring apparatus.

In the present invention, the pore forming agent preferably further includes an organic solvent. The organic solvent may be solvents of, for example, hydrocarbons, such as liquid paraffin, naphtha, white oil, kerosene, gas oil, etc.; aromatic hydrocarbons, such as toluene, xylene, etc.; and alcohols; ketones; esters; etc. It is preferable to use, among these, a petroleum solvent, such as naphtha, kerosene, gas oil, etc. in view of permeability of PTFE.

It is particularly preferable to use a petroleum solvent having a kinematic viscosity of $2\ mm^2/s$ ($40°$ C.) or more so as to be well retained by a PTFE powder. Once such an organic solvent is retained in interparticle areas of a powder, it is less likely to occur that the organic solvent exudes and the PTFE powder and the organic solvent are separated when a pressure for molding into a predetermined shape is applied, and thus a lubricating effect for lowering a resistance against a tube wall may be retained, as compared with a case of using an organic solvent itself having a low viscosity as a pore-forming agent.

Accordingly, an applicable range of mixed amounts of the PTFE powder and the pore-forming agent is wide, and a high lubricating effect and an excellent moldability (a good appearance of a molded body) may be obtained. Also, it may be possible to effectively suppress formation of lumps of powder by the PTFE powder or the dicarboxylic acid powder, and to obtain finer pores.

A PTFE is baked usually at an approximate temperature of 370-400° C. Since a solvent is preferably completely evaporated before baking is performed, the organic solvent preferably has a boiling point of 300° C. or lower. Also, terpenes, such as camphor or menthol, may be added appropriately to the pore-forming agent. However, such an added amount so as not to generate odor during a production process is preferable.

A PTFE mixture may be obtained by stirring and mixing the pore-forming agent and the PTFE powder, for example, in a tumbler or the like. In this case, porosity may be easily controlled by changing a mixed amount of the pore-forming agent. When a plurality of components are used in mixture as the pore-forming agent, the components for constituting the pore-forming agent are preferably mixed in advance to make the pore-forming agent homogeneous and thereby produce a more fine-textured PTFE porous body. However, the components for constituting the pore-forming agent may be added separately to the PTFE powder and then mixed together by stirring or the like.

Particularly in a case of producing a porous body having a high porosity exceeding 55% by paste extrusion, each of the pore-forming agent and the PTFE powder is preferably a fine powder having an average particle diameter of 100 μm or less, considering a mechanical strength (i.e., tendency of splitting) of a material. Particle refining of the PTFE powder need not be performed separately, and mixing of the PTFE powder and the pore-forming agent and particle refining of the PTFE powder may be performed at the same time in one process step. This process of mixing and particle refining may be performed easily in a gas phase by using a rotary blade grinder or mixer, and the like.

A PTFE mixture in another example may be prepared by mixing a PTFE powder and a pore-forming agent in a powder or viscous state to form integrated particles. By mixing the PTFE powder and the pore-forming agent to form integrated particles, pores may be made further finer and more uniform, and thus a fine-textured PTFE porous body may be obtained. Moreover, a further smaller resistance against a tube wall and a greater extrusion moldability may be achieved. This technique may be particularly advantageous for use in a filter in which a state of pores will directly influence air permeability properties or the like, "Integrated particles" here means a state in which particles of the PTFE powder and particles of the pore-forming agent are hardly observed as separate particles and are not easily separated into respective particles. Details of such integration may be obtained with reference to above-mentioned Patent Document 9.

By molding the PTFE mixture obtained as above into a predetermined shape and removing the pore-forming agent, pores are made in the PTFE and a PTFE porous body is produced. The molding of the PTFE mixture may be performed by a variety of known molding methods in the present invention. For example, it may be possible to mold a bulk material by metal molding, or mold a film material by rolling. Also, since a resistance against a tube wall is unlikely to be large and thus extrusion molding may be employed, it may be possible to form a covering over a conductor by extrusion molding to obtain an electric wire. As a method for removing the pore-forming agent, it is preferable to evaporate the pore-forming agent by heating that requires only simple equipment. However, evaporation of the pore-forming agent by reducing pressure or elution of the pore-forming agent by using a solvent, steam, or the like may be employed.

The PTFE porous body of the present invention may be used as a non-baked PTFE porous body by removing the pore-forming agent by, for example, heating at approximately 200° C. without performing subsequent baking. The PTFE porous body may also be used as a completely-baked PTFE porous body by removing the pore-forming agent and further performing baking at 370° C. or higher. Moreover, the PTFE porous body may be used as a semi-baked PTFE porous body, in which a non-baked portion and a completely baked portion are mixed, by controlling a baking temperature. A state of baking may be observed based on a crystal melting curve by differential scanning calorimetry (DSC). Only one peak is observed around 340° C. in the case of the "non-baked state", only one peak is observed around 320° C. in the case of "completely-baked state", and one peak around 340° C. as well as another peak around 320° C. are observed in the case of "semi-baked state". In addition to these states, there is a "slightly baked state" as described in International Patent Publication WO04/086416, which is an intermediate state between the "non-baked state" and the "semi-baked state". A criterion for classifying these states is presence/absence of a peak around 320° C. Specifically, when baking proceeds until a peak around 320° C. is observed clearly, the state has reached the "semi-baked state". The "slightly baked state" means a baked state before such a peak is observed.

Here is a more detailed description of the "slightly baked state". Each of FIG. 13 to FIG. 16 is a graph, showing a crystal melting curve by differential scanning calorimetry (DSC) of a dielectric material including a PTFE resin as a main component, plotting temperature on a horizontal axis and heat flow on a vertical axis to show respective changes. In FIG. 14 showing the "non-baked state", only one peak P1 is observed around 340° C. In FIG. 16 showing the "semi-baked state", a peak P1 is observed around 340° C. and also another peak P2 is observed around 320° C. In FIG. 15 showing the "completely-baked state", only one peak P2 is observed around 320° C. On the other hand, in FIG. 13 showing the "slightly-baked state", the intermediate state between the "non-baked state" shown in FIG. 14 and the "semi-baked state" shown in FIG. 16 is indicated. The criterion for classifying these states is presence/absence of the another peak P2 around 320° C. as shown in FIG. 16. Specifically, when baking proceeds until the another peak P2 is observed, the state has reached the "semi-baked state". The "slightly baked state" defined in the present invention means a baked state before the another peak P2 is observed. Determination of the "semi-baked state" or the "slightly-baked state" based on presence/absence of the another peak P2 was discovered by the present patent applicant as a result of repeated experiments. It is to be noted that stretching process may be additionally performed on these PTFE porous bodies.

When baked, a PTFE enters a semi-molten state, so that pores in a PTFE porous body decrease more or less, resulting in a reduced porosity. As baking proceeds, an extent of reduction of porosity becomes larger. Accordingly, a porosity before baking needs to be larger than a porosity after baking, which requires addition of a slightly excessive amount of the pore-forming agent.

As described above, in a case of a pore-forming agent in a low-viscosity liquid form, an excess amount thereof exudes, while in a case of a conventional pore-forming agent in a powder form, addition of a large amount of the pore-forming agent leads to an increased resistance against a tube wall and thereby to an increased pressure inside the extruder, resulting in a substantially lowered extrusion moldability. Also, it is extremely difficult to obtain an elongated product since heat treatment for baking causes a great shrinkage and thus cracks. Accordingly, there has not actually been an elongated PTFE porous body having a porosity of 5% or more, and being completely-baked and non-stretched, or an elongated PTFE porous body having a porosity of more than 22%, and being slightly-baked and non-stretched.

However, the PTFE porous body according to the present invention may be an elongated one having a porosity of 5% or more and being completely-baked and non-stretched. Also, an elongated one having a porosity of more than 22%, and being slightly-baked and non-stretched may be obtained. Here, "elongated", which is to be determined based on general criteria, is applicable to one having a length of approximately 20 times or more the diameter. The PTFE porous body as described above may be suitably used, for example, as a coaxial cable dielectric material having an excellent relative dielectric constant or a bulk filter. Especially, the PTFE porous body obtained as described above may be fine-textured and have an average pore diameter of 100 μm or less. The PTFE porous body, which may exhibit an excellent filtering function, is suitable as a filter for separating gas (e.g., air, water vapor) and liquid (e.g., water), or gas (e.g., air, water vapor) and solid (e.g., powder).

The PTFE porous body obtained as described above may have a controlled state of pores. For example, the state of pores may be such that pores are mostly independent pores in a case of a porosity of 5% or more to less than 40%, both independent pores and continuous pores in a case of a porosity of 40% or more to less than 50%, and mostly continuous pores in a case of a porosity of 50% or more. It may of course be possible to obtain a PTFE porous body having mostly continuous pores even in a case of a porosity of less than 50% by appropriately setting the particle diameter and the mixed amount of the pore-forming agent. Further, it may be possible to obtain a PTFE porous body having a porosity of 80% or more by increasing the mixed amount of the pore-forming agent.

Moreover, when an elongated PTFE porous body is produced by extrusion molding, pores are oriented in a longitudinal direction. With such configured pores, even the elongated PTFE porous body is unlikely to be severed due to a high tensile strength in the longitudinal direction and is strong against bending due to less likeliness of cracks, and thus is easy to handle.

The PTFE porous body obtained as described above may be retained by a fluororubber molding to provide an assembly. The assembly including the PTFE porous body retained by the fluororubber molding may be used in a high-temperature environment, and thus may be suitably used, for example, for a grommet with a filter for use in an oxygen sensor. Specific examples may be found, for example, in Patent Document 9.

Also, the PTFE porous body may be employed to cover a circumference of a center conductor to provide an insulated electric wire (a lead). The PTFE porous body of the present invention may reduce shrinkage after baking by selecting the pore forming agent as described above. Accordingly, by covering the circumference of the center conductor with the PTFE porous body, generation of splits or cracks may be suppressed and a favorable appearance may be obtained. Further, the insulated electric wire may be retained by a fluororubber molding to obtain a grommet with a lead. In these cases, it may be possible to provide air permeability to an insulating covering by controlling a porosity of the PTFE porous body.

Moreover, it may be possible to form a metal wire braiding or a corrugated metal pipe or the like on the circumference of the PTFE porous body to provide a coaxial cable. When a porosity of the covering with the PTFE porous body, i.e., the dielectric material, is set high as described above, a delay time of signal may be reduced, and thus an excellent coaxial cable may be obtained. In this case, it may be possible to provide a groove continuous in the longitudinal direction or a spiral groove in an outer circumference of the dielectric material, or to form a gap continuous in the longitudinal direction inside the dielectric material by devising an extruding shape, in order to further reduce the delay time of signal.

EMBODIMENTS

Embodiments of the present invention will be described below in comparison with comparative examples.

Embodiments 1-15

A PTFE powder; and a dicarboxylic acid powder (fumaric acid, malonic acid, succinic acid, malic acid, or adipic acid) and an organic solvent (naphtha (kinematic viscosity: 3 $mm^2/s$ (40° C.)), gas oil, and a naphthenic solvent (Exxsol D130 produced by Exxon Corp.) as pore-forming agents were mixed in ratios (parts by weight) shown in Tables 1-3 to obtain respective PTFE mixtures.

TABLE 1

|  |  | Embodiment 1 | Embodiment 2 | Embodiment 3 | Embodiment 4 | Embodiment 5 |
|---|---|---|---|---|---|---|
| PTFE powder |  | 20 | 20 | 30 | 40 | 40 |
| Pore-forming agent | Fumaric acid | 75 | 60 | 50 | 50 | 40 |
|  | Malonic acid | — | — | — | — | — |
|  | Succinic acid | — | — | — | — | — |
|  | Malic acid | — | — | — | — | — |
|  | Adipic acid | — | — | — | — | — |
|  | Naphtha | 5 | 20 | 20 | 10 | 20 |
|  | Gas oil | — | — | — | — | — |
|  | Exxsol D130 | — | — | — | — | — |
| Porosity (%) |  | 51 | 60 | 58.5 | 49.9 | 51.7 |
| Shrinkage rate (%) |  | 6 | 7 | 8 | 8 | 12 |

TABLE 2

|  |  | Embodiment 6 | Embodiment 7 | Embodiment 8 | Embodiment 9 | Embodiment 10 |
|---|---|---|---|---|---|---|
| PTFE powder |  | 50 | 60 | 40 | 40 | 40 |
| Pore-forming agent | Fumaric acid | 40 | 25 | 40 | 40 | — |
|  | Malonic acid | — | — | — | — | 50 |
|  | Succinic acid | — | — | — | — | — |
|  | Malic acid | — | — | — | — | — |
|  | Adipic acid | — | — | — | — | — |
|  | Naphtha | 10 | 15 | — | — | 10 |
|  | Gas oil | — | — | 20 | — | — |
|  | Exxsol D130 | — | — | — | 20 | — |
| Porosity (%) |  | 47.8 | 35.2 | 51.6 | 51.8 | 58.1 |
| Shrinkage rate (%) |  | 14 | 13 | 12 | 12 | 32 |

TABLE 3

|  |  | Embodiment 11 | Embodiment 12 | Embodiment 13 | Embodiment 14 | Embodiment 15 |
|---|---|---|---|---|---|---|
| PTFE powder |  | 40 | 40 | 40 | 40 | 40 |
| Pore-forming agent | Fumaric acid |  |  |  |  |  |
|  | Malonic acid |  | 40 |  |  |  |
|  | Succinic acid |  |  | 50 | 40 |  |
|  | Malic acid |  |  |  |  | 50 |
|  | Adipic acid |  |  |  |  |  | 50 |

TABLE 3-continued

|  | Embodiment 11 | Embodiment 12 | Embodiment 13 | Embodiment 14 | Embodiment 15 |
|---|---|---|---|---|---|
| Naphtha | 20 | 10 | 20 | 10 | 10 |
| Gas oil |  |  |  |  |  |
| Exxsol $D_{130}$ |  |  |  | 20 |  |
| Porosity (%) | 43.3 | 57.8 | 48.1 | 58.8 | 48.8 |
| Shrinkage rate (%) | 35 | 23 | 31 | 20 | 27 |

Each of these PTFE mixtures was placed in a metal mold and was preformed by compression molding, and then a cylindrical molding having an outside diameter of approximately 4 mm was extruded with a paste extruder (cylinder diameter: 20 mm). The molding was cut to have a length of 70 mm, heat treated at a temperature of a melting point of PTFE or lower to evaporate and remove the pore-forming agents, and further heat treated and baked at a temperature of the melting point of PTFE or higher (400° C.) to prepare a sample piece.

The porosity and the shrinkage rate after heat treatment of each sample piece were measured. The porosity was obtained by setting a sample piece prepared in a same manner as in Embodiment 1 except that pore-forming agent was not mixed therein as a reference sample piece, and by using a calculation formula:

"Porosity=100−(specific gravity of the sample piece/ specific gravity of the reference sample piece)× 100".

The shrinkage rate was obtained by dividing a sample length after heat treatment by a sample length before heat treatment. Values of the porosity and the shrinkage rate are shown in above Table 1 to Table 3.

Embodiments 16-18, Comparative Examples 1-4

Each sample was prepared in a same manner as in Embodiments 1-15 except that a benzoic acid powder or a camphor powder was used instead of the dicarboxylic acid powder, and the porosity and the shrinkage rate were measured. Values of the mixing ratio, the porosity, and the shrinkage rate are indicated in Table 4.

instead of the dicarboxylic acid powder, had a shrinkage rate of higher than 35% and thus was poor in dimensional accuracy.

More detailed observation revealed, as a result of comparison among Embodiments 4, 10, 12, 14 and 15 having a composition of 40 parts by weight of a PTFE powder—50 parts by weight of a dicarboxylic acid powder—10 parts by weight of an organic solvent, that shrinkage rates were different among the embodiments in which the dicarboxylic acid powder was used. It was confirmed that particularly Embodiment 4, in which a fumaric acid powder was employed as the dicarboxylic acid powder, had a low shrinkage rate and was especially excellent in dimensional accuracy.

Also, it was confirmed, as a result of observation of Embodiments 1-9 having different mixing ratios to control the porosity, that any sample piece did not have an extremely high shrinkage rate and was excellent in dimensional accuracy. In a case of a molding such as an electric wire, a PTFE mixture is covered on an outer circumference of a non-shrinkable core conductor, and the PTFE mixture and the core conductor are baked together. Accordingly, if only the PTFE mixture shrinks extremely, cracks may be generated. Since the PTFE mixture in which a fumaric acid powder is employed as the pore-forming agent has a low shrinkage rate as described above, the PTFE mixture is unlikely to cause cracks when covered on an outer circumference of a core conductor and heat treated, and thus is greatly suitable for covering an electric wire.

In contrast, among Comparative Examples 1-4, in which a camphor powder was employed instead of the dicarboxylic

TABLE 4

|  |  | Embodiment 16 | Embodiment 17 | Embodiment 18 | Comparative Example 1 | Comparative Example 2 | Comparative Example 3 | Comparative Example 4 |
|---|---|---|---|---|---|---|---|---|
| PTFE powder |  | 40 | 40 | 40 | 40 | 40 | 40 | 40 |
| Pore- forming agent | Camphor | — | — | — | 55 | 53 | 51.5 | 50 |
|  | Benzoic acid | 50 | 45 | 40 | — | — | — | — |
|  | Organic solvent | 10 | 20 | 20 | 5 | 7 | 8.5 | 10 |
| Porosity (%) |  | 46.2 | 32.5 | — | 47.1 | 49.2 | 54.1 | — |
| Shrinkage rate (%) |  | 42 | 50 | — | 42 | 39 | 37 | — |
| Odor |  | Absent | Absent | Absent | Present | Present | Present | Present |

It was confirmed, as shown by the porosities in Embodiments 1-18, that the porosity of the PTFE porous body of the present invention may be controlled over a wide range of 35-60% by changing the mixing ratio of the PTFE mixture.

Also, each of the PTFE porous bodies in Embodiments 1-18 had a fine-textured surface. Further, no odor was generated during production of any of the PTFE porous bodies in Embodiments 1-18.

In addition, each of, the PTFE porous bodies in Embodiments 1-15, in which a dicarboxylic acid powder was employed as a component of the pore-forming agent, achieves an effect of a low shrinkage rate (35% at the maximum). In contrast, it was confirmed that each of Comparative Examples 1-3, in which a camphor powder was employed acid powder, each of Comparative Examples 1-3 showed a shrinkage rate of higher than 35% and was poor in dimension accuracy, while a sample piece could not be obtained in Comparative Example 4 since the organic solvent had exuded during a preforming process. Also, odor was generated during production of each of the PTFE porous bodies in Comparative Examples 1-4 using the camphor powder.

Embodiments 19-22, Comparative Example 5

A production method of a coaxial cable will be described based on FIG. 1. Firstly, a PTFE powder; and a dicarboxylic acid powder (a fumaric acid powder) and an organic solvent (naphtha (kinematic viscosity: 5 mm²/s (40° C.)) as pore-forming agents were mixed at ratios (parts by weight) as shown in Table 5 to obtain each of PTFE mixtures.

TABLE 5

|  |  |  | Embodiment 19 | Embodiment 20 | Embodiment 21 | Embodiment 22 | Comparative Example 5 |
|---|---|---|---|---|---|---|---|
| PTFE powder |  |  | 40 | 40 | 60 | 60 | 83 |
| Pore-forming agent | Fumaric acid |  | 44 | 44 | 25 | 25 | 0 |
|  | Organic solvent |  | 16 | 16 | 15 | 15 | 17 |
| Core conductor diameter (mm) |  |  | 0.93 | 1.17 | 0.93 | 1.11 | 0.93 |
| Dielectric material diameter (mm) |  |  | 2.27 | 2.9 | 2.38 | 2.9 | 2.9 |
| Dielectric material porosity (%) |  |  | 57.8 | 57.8 | 45 | 45 | 0 |
| Wire diameter of external conductor (mm) |  |  | 0.12 | 0.12 | 0.12 | 0.12 | 0.12 |
| Finished outside diameter (mm) |  |  | 2.87 | 3.5 | 2.98 | 3.5 | 3.5 |
| Hardness of Dielectric material |  |  | A79 | A79 | A85 | A85 | D37 |
| Effective relative dielectric constant |  |  | 1.35 | 1.35 | 1.48 | 1.48 | 2.05 |
| Transmission characteristics | Attenuation (dB/m) at 20° C. | 1 GHz | 0.4 | 0.33 | 0.4 | 0.34 | 0.42 |
|  |  | 2 GHz | 0.56 | 0.46 | 0.56 | 0.48 | 0.63 |
|  |  | 3 GHz | 0.71 | 0.58 | 0.71 | 0.6 | 0.79 |
|  |  | 5 GHz | 0.93 | 0.76 | 0.93 | 0.79 | 1.05 |
|  |  | 10 GHz | 1.36 | 1.12 | 1.37 | 1.17 | 1.59 |
|  |  | 18 GHz | 1.88 | 1.55 | 1.89 | 1.61 | 2.33 |
|  | Delay time (ns/m) at 20° C. |  | 3.9 | 3.9 | 4.1 | 4.1 | 4.8 |
| Characteristic impedance |  |  | 50 | 49.9 | 49.9 | 50.3 | 49.4 |

Each of these PTFE mixtures was filled into a gap of a cylinder and was pressurized to obtain a preform. Then, the preform was extruded with the paste extruder so as to cover, by extrusion, an outer circumference of a center conductor 1 constituted by a silver-plated copper-coated steel wire having an outside diameter of 0.93 mm. Subsequently, heat treatment was performed at a temperature of the melting point of PTFE or lower to evaporate and remove the pore-forming agent, and further heat treatment was performed in a same process at a temperature of the melting point of PTFE or higher to obtain a baked PTFE porous body.

As described above, an insulated electric wire with the dielectric material 2 including the PTFE porous body molded on the outer circumference of the center conductor 1 was produced. Further, a braided covering with tin-plated annealed copper wires having a wire diameter of 0.12 mm and a covering with melted tin were provided as an external conductor 3 on an outer circumference of the dielectric material 2 of the insulated electric wire to obtain a coaxial cable 4.

The coaxial cable 4 produced by using the PTFE mixture having a composition shown in Comparative Example 5 is commercially available as a so-called common general-purpose PTFE coaxial cable.

With respect to Embodiments 19-22 and Comparative Example 5, characteristics evaluation tests listed below were performed. Test results are shown in above Table 5.

(Effective Relative Dielectric Constant)

An effective relative dielectric constant was calculated from a delay time measured with a network analyzer (HP8510E, produced by Hewlett-Packard Company) using a calculation formula below. Measurement conditions were a frequency of 2 GHz and a temperature of 20° C.

$$\tau = 3.33561\sqrt{\in_e}$$

τ: Delay time of signal (ns/m)
$\in_e$: Effective relative dielectric constant of dielectric material (Hardness)

A value measured with a Type D durometer or a Type A durometer was used. A dielectric material obtained by pulling a center conductor out of each electric cable having a length of 30 cm was used as a sample for measurement of hardness. Measurement of hardness was performed according to a test method defined by "JIS K 6253-1997 Hardness testing methods for rubber, vulcanized or thermoplastic".

(Transmission characteristics)

Attenuation (dB/m) in a range of 1GHz-18GHz at a measurement temperature of 20° C. was measured. Also, a delay time (ns/m) at 2GHz was measured.

(Characteristic Impedance)

Evaluation was performed by comparing an actual value measured according to TDR method and a calculated value obtained by the following calculation formula:

$$ZO = 60/\sqrt{\in_e} \ln\{(D+1.5dW)/d\}$$

In the formula, ZO is a characteristic impedance, D is a core outside diameter (mm), dW is a braid wire diameter (mm), and $\in_e$ is an effective relative dielectric constant of the dielectric material.

As shown in Table 5, the dielectric material 2 constituting the coaxial cable 4 in each of Embodiments 19-22 has a high porosity in a range of 45.0% to 57.8%. As a result, in comparison of the attenuation at 2 GHz, for example, the coaxial cable 4 in Comparative Example 5 exhibits a value of 0.63 dB/m, while the coaxial cable 4 in each of Embodiments 19 and 21 exhibits an excellent value of 0.56 dB/m despite the same center conductor diameter of 0.93 mm and a smaller finished outside diameter.

Also, the coaxial cable 4 in each of Embodiments 20 and 22 has a high dielectric material porosity as mentioned above. Accordingly, when the coaxial cable is configured to have the same finished outside diameter as the coaxial cable in Comparative Example 5, a core conductor may be configured to have a larger diameter. As a result, remarkably improved attenuations of 0.46 and 0.48 at 2 GHz can be achieved, respectively.

A hardness of the dielectric material 2 constituting coaxial cable 4 in each of Embodiments 19-22 is lower than a hardness in Comparative Example 5, but is at a same or higher level as a hardness of a commercially available foamed coaxial cable material, such as a foamed polyethylene coaxial cable, and thus will not cause any problem in formation of an external conductor or actual use, Formation of an external conductor may be performed by longitudinally attaching or transversely winding a tape, a film, or the like on an outer circumference of the dielectric material, in order to prevent the external conductor from being buried in the dielectric material, and then further forming the external conductor on an outer circumference thereof.

Surfaces, cut with a knife, of a sample piece of the dielectric material 2 constituting the coaxial cable 4 in each of Embodiments 19 and 22 were observed with a scanning electron microscope to confirm a state of pores. FIG. 2 is a photograph at a magnification of 100 times showing a surface of a sample piece in Embodiment 19 cut in a longitudinal direction. FIG. 3 is a photograph at a magnification of 1000 times showing the surface of the sample piece in Embodiment 19 cut in the longitudinal direction. FIG. 4 is a photograph at a magnification of 100 times showing a surface of the sample piece in Embodiment 19 cut perpendicularly to the longitudinal direction. FIG. 5 is a photograph at a magnification of 1000 times showing the surface of the sample piece in Embodiment 19 cut perpendicularly to the longitudinal direction. FIG. 6 is a photograph at a magnification of 100 times showing a surface of a sample piece in Embodiment 22 cut in a longitudinal direction. FIG. 7 is a photograph at a magnification of 1000 times showing the surface of the sample piece in Embodiment 22 cut in the longitudinal direction. FIG. 8 is a photograph at a magnification of 100 times showing a surface of the sample piece in Embodiment 22 cut perpendicularly to the longitudinal direction. FIG. 9 is a photograph at a magnification of 1000 times showing the surface of the sample piece in Embodiment 22 cut perpendicularly to the longitudinal direction.

In any of the photographs, pores oriented in the longitudinal direction are observed. Also, it was confirmed that the pores had a uniform size, and the dielectric material 2 was fine-textured.

It is known that a size of pores is influenced by a particle size of a pore-forming agent. To obtain finer pores, the pore-forming agent may be ground in advance, or a PTFE powder and the pore-forming agent may be ground together before being molded.

Figure 10:
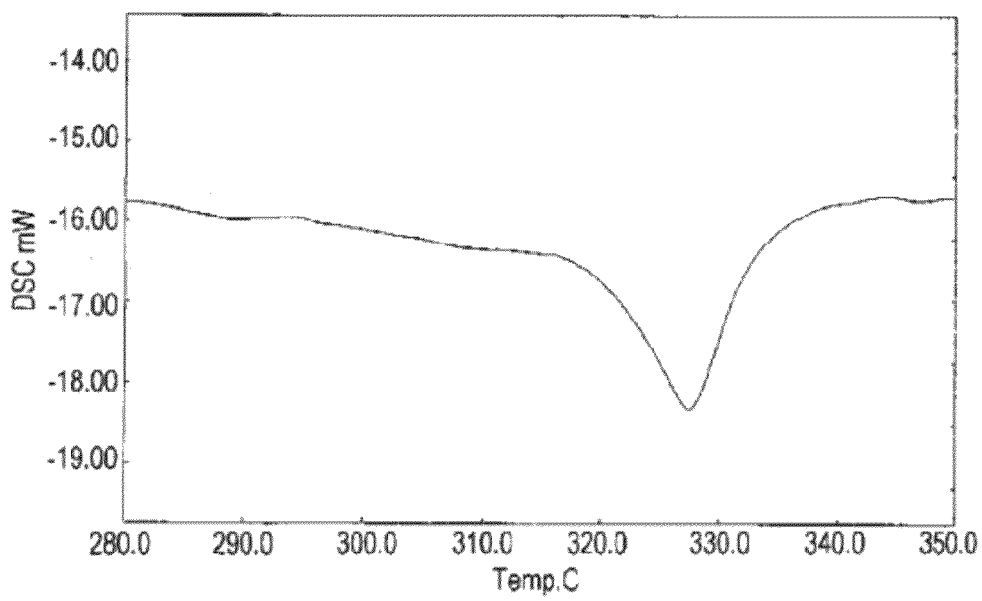
FIG. 10 is a crystal melting curve of Embodiment 19.

Also, a differential scanning calorimetry (DSC) measurement was performed on sample pieces of Embodiments 19-22 by "JIS K 7122 Testing methods for heat of transitions of plastics", and respective endothermic peaks were confirmed in obtained respective crystal melting curves. According to the DSC measurement, a peak around 320.330° C., which is characteristic to a completely-baked PTFE, was observed in any of the sample pieces, and thus it was confirmed that a completely-baked PTFE was obtained as a result of heat-baking treatment at 400° C. for 10 minutes. FIG. 10 shows a crystal melting curve of Embodiment 19.

(Embodiment 23)

25 g of a fumaric acid powder was put into a commercially available small rotary blade type grinder and was ground for 24 minutes to obtain a fine powder having an average particle diameter of 100 µm or less. Then, the obtained fumaric acid fine particles and a PTFE powder (fine powder) at a weight ratio of 44:40 and having a total weight of 336 g were put into a commercially available rotary blade type grinding mixer, and then mixing and simultaneous particle refining of the PTFE powder were performed for 2 minutes to obtain an average particle diameter of 100 µm or less.

Subsequently, an organic solvent (naphtha, kinematic viscosity: 5 mm$^2$/s (40° C.) was added to the mixed fumaric acid powder and PTFE powder such that a weight content of the organic solvent is 16%, and was mixed for 5 minutes in a tumbler to obtain a PTFE mixture.

Then, the PTFE mixture was filled into a gap of a cylinder and was pressurized to obtain a preform. Then, the preform was extruded with a paste extruder so as to cover, by paste extrusion molding, an outer circumference of a center conductor constituted by a silver-plated copper-coated steel wire having an outside diameter of 0.93 mm.

Subsequently, heat treatment was performed at a temperature of the melting point of PTFE or lower to evaporate and remove the pore forming agent, and further heat treatment was performed at a temperature of the melting point of PTFE or higher to bake PTFE.

As described above, an insulated electric wire with a dielectric material including the PTFE porous body formed on the outer circumference of the center conductor was produced. A surface of the insulated wire was photographed with a scanning electron microscope (SEM).

(Embodiment 24)

A production method in Embodiment 24 was basically the same as the method in Embodiment 23. However, a PTFE mixture having a weight ratio of 44:40:16 among fumaric acid fine particles: PTFE fine powder: and naphtha was obtained without performing processes of mixing with a rotary blade type grinding mixer and particle refining of PTFE particles, and then an insulated electric wire was produced by paste extrusion in a same manner as in Embodiment 23. A surface of the insulated wire was photographed with the SEM.

Figure 11:
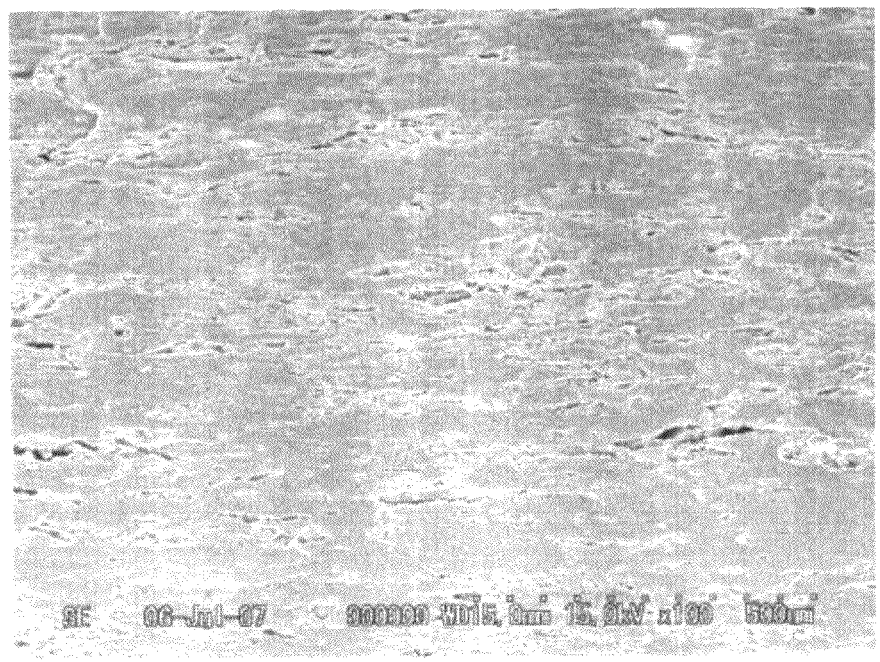
FIG. 11 is an SEM photograph of a surface of an insulated electric wire produced in Embodiment 23.
Figure 12:
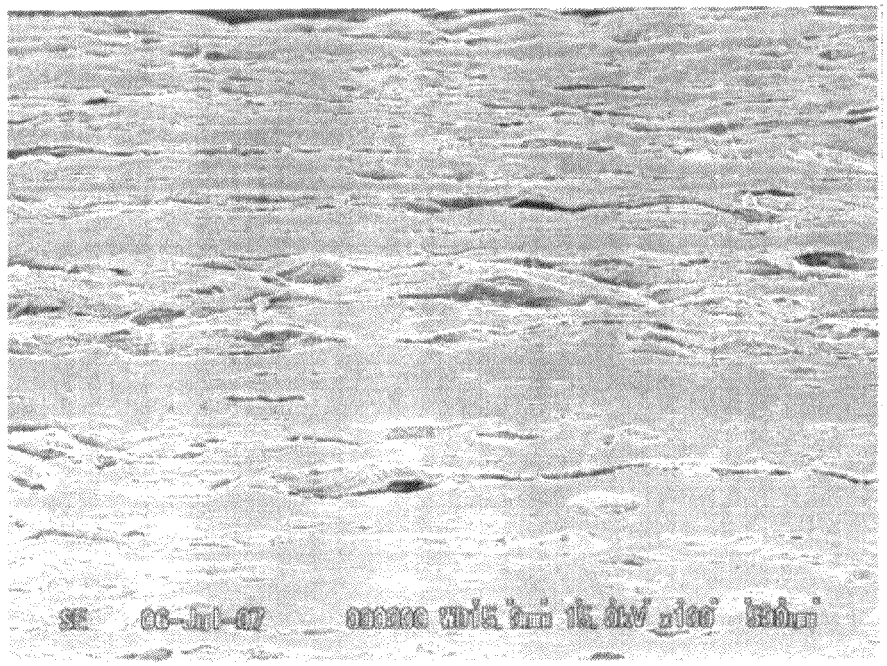
FIG. 12 is an SEM photograph of a surface of an insulated electric wire produced in Embodiment 24.

FIG. 11 is an SEM photograph showing a surface of the insulated electric wire produced in Embodiment 23. FIG. 12 is an SEM photograph showing a surface of the insulated electric wire produced in Embodiment 24. As clearly shown in FIG. 11 and FIG. 12, pores in the insulated electric wire produced in Embodiment 23 are shorter than pores in the insulated electric wire produced in Embodiment 24. Thus, the surface of the PTFE porous body may be further fine-textured by particle refining of the PTFE powder. This may make a material unlikely to be split and also hard, and thus may prevent a trouble that the PTFE porous body is split by an external force and the core conductor is exposed during or after the production of the electric wire, which is advantageous.

Here, the particle diameter of the PTFE powder is not limited to 100 µm or less since the PTFE porous body may be molded without using a PTFE powder having a particle diameter of 100 µm or less.

It is to be understood that the present invention should not be limited to the above described embodiments, but may be practiced in various forms within the scope not departing from the present invention.

According to the present invention, for example, the porosity may be easily controlled using the mixed amount of the pore-forming agent. Accordingly, the porosity may be appropriately changed to, for example, 5%, 10%, 20%, or 30% in addition to 40.60% as in the above described embodiments. By applying such porosity control, a greatly advantageous filter material, such as a gas-liquid separation filter, may be achieved.

Also, according to the present invention, it may be possible to obtain a PTFE porous body substantially consisting only of PTFE and not including a binding agent, another fluororesin, or the like. Accordingly, the PTFE porous body may prevent adverse effects on transmission characteristics, characteristic impedance, and the like due to a binding agent, another fluororesin, or the like, and thus may be greatly advantageous for electrical use, such as a dielectric material in a coaxial cable.

The invention claimed is:

1. A polytetrafluoroethylene porous body which is produced by molding a polytetrafluoroethylene mixture, including a polytetrafluoroethylene powder and a pore-forming agent, into a predetermined shape, and subsequently removing the pore-forming agent, the pore-forming agent including one or more powders selected from a group consisting of dicarboxylic acid powders and benzoic acid powders.

2. The polytetrafluoroethylene porous body according to claim 1, wherein the pore-forming agent further includes an organic solvent.

3. The polytetrafluoroethylene porous body according to claim 2, wherein the organic solvent is a petroleum solvent having a kinematic viscosity of 2 mm$^2$/s (40° C.) or more.

4. The polytetrafluoroethylene porous body according to claim 1, wherein the one or more powders selected from the group consisting of dicarboxylic acid powders and benzoic acid powders are a fumaric acid powder.

5. The polytetrafluoroethylene porous body according to claim 1, wherein the one or more powders selected from the group consisting of dicarboxylic acid powders and benzoic acid powders have a particle diameter of 100 μm or less.

6. The polytetrafluoroethylene porous body according to claim 1, wherein a shrinkage rate in one side after baking is 35% or less.

7. A polytetrafluoroethylene porous body according to claim 1, wherein the polytetrafluoroethylene porous body has a porosity of 5% or more, has only an endothermic peak of a baked state (a completely-baked state) in a crystal melting curve by differential scanning calorimetry (DSC), and has a non-stretched and elongated configuration.

8. A polytetrafluoroethylene porous body according to claim 7, wherein pores are configured to be oriented in a longitudinal direction.

9. A polytetrafluoroethylene porous body according to claim 1, wherein the polytetrafluoroethylene porous body has a porosity of 5% or more, has an ambiguous endothermic peak of a baked state (a completely-baked state) in a crystal melting curve by differential scanning calorimetry (DSC), and has a non-stretched and elongated configuration.

10. The polytetrafluoroethylene porous body according to claim 9, wherein pores are configured to be oriented in a longitudinal direction.

11. An insulated electric wire comprising:
a center conductor; and
an insulating material molded on a circumference of the center conductor, the insulating material including the polytetrafluoroethylene porous body according to claim 1.

12. A coaxial cable comprising:
the insulated electric wire according to claim 11; and
an external conductor formed on a circumference of the insulating material of the insulated electric wire.

13. The coaxial cable according to claim 12, wherein the external conductor includes braided metal wires.

14. The coaxial cable according to claim 12, wherein the external conductor includes a metal pipe.

15. The coaxial cable according to claim 14, wherein the external conductor includes a corrugated metal pipe.

16. A polytetrafluoroethylene mixture, comprising:
a polytetrafluoroethylene powder; and
a pore-forming agent including one or more powders selected from a group consisting of dicarboxylic acid powders and benzoic acid powders.

17. The polytetrafluoroethylene mixture according to claim 16, wherein the pore-forming agent further includes an organic solvent.

18. The polytetrafluoroethylene mixture according to claim 16, wherein the one or more powders selected from the group consisting of dicarboxylic acid powders and benzoic acid powders are a fumaric acid powder.

19. The polytetrafluoroethylene mixture according to claim 16, wherein the one or more powders selected from the group consisting of dicarboxylic acid powders and benzoic acid powders have a particle diameter of 100 μm or less.

20. A method for producing a polytetrafluoroethylene porous body, comprising the steps of:
molding the polytetrafluoroethylene mixture according to claim 16 into a predetermined shape; and
subsequently removing the pore-forming agent to make pores.

* * * * *